US012569858B2

(12) United States Patent
Chen et al.

(10) Patent No.: US 12,569,858 B2
(45) Date of Patent: Mar. 10, 2026

(54) PAPER SHREDDER CAPABLE OF FEEDING PAPER LATERALLY

(71) Applicant: Aurora Office Equipment Co., Ltd. Shanghai, Shanghai (CN)

(72) Inventors: Guanglong Chen, Shanghai (CN); Lei Shu, Shanghai (CN)

( * ) Notice: Subject to any disclaimer, the term of this patent is extended or adjusted under 35 U.S.C. 154(b) by 286 days.

(21) Appl. No.: 18/207,132

(22) Filed: Jun. 7, 2023

(65) Prior Publication Data

US 2023/0398550 A1 Dec. 14, 2023

(30) Foreign Application Priority Data

Jun. 9, 2022 (CN) ......................... 202221428410.2
Jun. 9, 2022 (CN) ......................... 202221428419.3
Jun. 9, 2022 (CN) ......................... 202221430634.7

(51) Int. Cl.
*B02C 18/22* (2006.01)
*B02C 18/00* (2006.01)

(52) U.S. Cl.
CPC ...... *B02C 18/2283* (2013.01); *B02C 18/0007* (2013.01); *B02C 2018/2208* (2013.01)

(58) Field of Classification Search
CPC . B02C 18/2283; B02C 18/0007; B02C 18/16; B02C 18/162; B02C 2018/2208
See application file for complete search history.

(56) References Cited

U.S. PATENT DOCUMENTS

2011/0303775 A1* 12/2011 Kim ........................ B02C 23/02 241/34
2012/0018554 A1* 1/2012 Seo ..................... B02C 18/2283 241/101.2

FOREIGN PATENT DOCUMENTS

CN 203609296 U * 5/2014
CN 112169952 A * 1/2021 ......... B02C 18/2283

OTHER PUBLICATIONS

English translate (CN112169952A), retrieved date Jun. 10, 2025.*
English translate (CN203609296U), retrieved date Jun. 10, 2025.*

* cited by examiner

*Primary Examiner* — Mohammed S. Alawadi
(74) *Attorney, Agent, or Firm* — WHGC, P.L.C.; Alexander R. Schlee

(57) ABSTRACT

A paper shredder capable of feeding paper laterally, a paper holder, a curved paper box, a paper pick-up assembly, and a paper shredding assembly. The paper holder connects with the curved paper box. A paper holding plate is disposed on an upper surface the paper holder close to the curved paper box, and the first paper holding plate and/or the second paper holding plate incline downwards toward the paper inlet. The paper pick-up assembly is disposed in the first paper holding plate and is close to the paper inlet. The paper shredding assembly is disposed below the paper inlet, and the end, away from the curved paper box, of the paper is driven by a paper pick-up assembly to enter the paper shredding assembly through the paper inlet.

10 Claims, 10 Drawing Sheets

PAPER SHREDDER CAPABLE OF FEEDING PAPER LATERALLY

CROSS-REFERENCE TO RELATED APPLICATIONS

The instant US Nonprovisional patent application claims the priority rights from the Chinese utility models CN 217368674 U, CN 217450434 U and CN 217631938 U, all of which having a filing date of Jun. 9, 2022.

TECHNICAL FIELD

The invention belongs to the technical field of paper shredders, and particularly, relates to a paper shredder capable of feeding paper laterally, particularly relates to paper shredders having a curved paper box for a paper shredder and a rotary connector for a cover plate of a paper shredder.

BACKGROUND OF THE INVENTION

Paper shredders are used for shredding paper. After being placed on the paper shredder, paper to be shredded enters the paper shredder through a paper inlet and then is shredded through a cutter shaft assembly.

At present, paper shredders capable of shortening the length of paper on the market use a curved paper box to shorten the horizontal length of paper, to reduce the length of paper shredders.

However, paper has to be folded before being placed into the paper shredders capable of shortening the length of paper on the market, so the paper shredding efficiency is low, and the horizontal length of paper cannot be changed to a large extent.

Further, a curved paper boxes of a paper shredder may be used for containing to-be-shredded paper. When the to-be-shredded paper is placed in the curved paper box, one end of the paper bends downward to change the horizontal length of the paper, so the size of the paper shredders can be decreased. However, paper cannot be stacked in order when placed in existing curved paper boxes and is likely to move when shredded, making paper shredding unstable.

In addition, a cover plate of a paper shredder may be disposed over an upper cover of the paper shredder and is used for covering or opening the paper shredder. A paper pressing plate is fixedly disposed on a lower surface of the cover plate of the paper shredder and is used for pressing a stack of to-be-shredder paper placed in a paper holder when users close the cover plate of the paper shredder. The cover plate of existing paper shredders is rotatably connected to the upper cover through a pivot, which is complex in structure and difficult to install.

SUMMARY OF THE INVENTION

According to a first aspect of the invention, a paper shredder capable of feeding paper laterally is provided, comprising a paper shredder body, wherein the paper shredder body is provided with a paper holder, a curved paper box, a paper pick-up assembly and a paper shredding assembly; wherein the paper holder connects to the curved paper box, one end of a stack of paper to be shredded is placed in the paper holder, and the other opposite end of the stack of paper is placed in the curved paper box; a paper holding plate is disposed on an upper surface of an inner side of the paper holder and is used for holding the paper; a paper inlet is formed in a side, away from the curved paper box, of the paper holding plate and partitions the paper holding plate into a first paper holding plate and a second paper holding plate, the second paper holding plate is close to the curved paper box, and the first paper holding plate and/or the second paper holding plate incline downwards toward the paper inlet; and the paper pick-up assembly is disposed in the first paper holding plate and is close to the paper inlet, the paper shredding assembly is disposed below the paper inlet, and the end, away from the curved paper box, of the paper is driven by the paper pick-up assembly to enter the paper shredding assembly through the paper inlet.

According to a second aspect of the invention, a curved paper box for a paper shredder is provided, comprising: a main part, the main part being hollow to form a paper cavity which bends downwards, and openings being formed in an upper end and a lower end of the paper cavity; and a plurality of paper holding blocks disposed on the main part side by side and located on a side provided with a lower opening of the paper cavity, first paper holding slopes being disposed at upper ends of the paper holding blocks towards the lower opening of the paper cavity; wherein said curved paper box is shaped to bend paper entering the paper cavity from an upper opening of the paper cavity downwards along the paper cavity and have a lower end of the paper abut against the first paper holding slopes.

According to a second aspect of the invention, a rotary connector for a cover plate of a paper shredder is provided, being used for rotatably connecting a cover plate and an upper cover of a paper shredder, wherein the rotary connector comprises a mounting base, a rotary shaft and a torsion elastic piece; the mounting base is fixed on the cover plate through a first mounting part; the rotary shaft is disposed at one end of the mounting base; and the torsion elastic piece is disposed around the rotary shaft, has an actuating end fixedly disposed on the rotary shaft and a fixed end fixed on the upper cover through a second mounting part, and applies an elastic force to the rotary shaft and the cover plate to enable the rotary shaft and the cover plate to rotate away from the upper cover.

DETAILED DESCRIPTION OF THE INVENTION

In view of the problems in the background, the invention aims to provide a paper shredder capable of feeding paper laterally, comprising a paper shredder body, wherein the paper shredder body is provided with a paper holder, a curved paper box, a paper pick-up assembly and a paper shredding assembly; the paper holder connects to the curved paper box, one end of a stack of paper to be shredded is placed in the paper holder, and the other opposite end of the stack of paper is placed in the curved paper box; a paper holding plate is disposed on an upper surface of an inner side of the paper holder and is used for holding the paper; a paper inlet is formed in a side, away from the curved paper box, of the paper holding plate and partitions the paper holding plate into a first paper holding plate and a second paper holding plate, the second paper holding plate is close to the curved paper box, and the first paper holding plate and/or the second paper holding plate incline downward toward the paper inlet.

The paper pick-up assembly is disposed in the first paper holding plate and is close to the paper inlet, the paper shredding assembly is disposed below the paper inlet, and the end, away from the curved paper box, of the paper is driven by the paper pick-up assembly to enter the paper shredding assembly through the paper inlet.

Preferably, the curved paper box comprises:

A main part, the main part being hollow to form a paper cavity which bends downward, and openings being formed in an upper end and a lower end of the paper cavity; and A plurality of paper holding blocks disposed on the main part side by side and located on a side provided with a lower opening of the paper cavity, first paper holding slopes being disposed at upper ends of the paper holding blocks towards the lower opening of the paper cavity;

The paper enters the paper cavity from an upper opening of the paper cavity, and after the paper bends downward along the paper cavity, a lower end of the paper abuts against the first paper holding slopes.

Preferably, the main part comprises an upper paper guide assembly and a lower paper guide assembly which are connected, the lower paper guide assembly is provided with a linear slot which is open downward, and the paper holding blocks are disposed at a lower end of the lower paper guide assembly and are opposite to the linear slot;

The paper cavity is formed between the upper paper guide assembly and the lower paper guide assembly, the upper opening of the paper cavity is formed between an upper end of the upper paper guide assembly and an upper end of the lower paper guide assembly, and the lower opening of the paper cavity is formed in the linear slot.

Preferably, the paper pick-up assembly comprises a paper pick-up wheel shaft and a paper pick-up wheel disposed on the paper pick-up wheel shaft, the paper pick-up wheel shaft is arranged in a length direction of the paper inlet, and the paper pick-up wheel is disposed in a paper pick-up hole formed in the first paper holding plate and partially protrudes out of an upper surface of the first paper holding plate.

Preferably, the paper pick-up assembly comprises at least one paper pick-up wheel.

Preferably, the paper shredder further comprises adjustment sleeves disposed around and fastened on the paper holding blocks, second paper holding slopes facing the lower opening of the paper cavity are disposed at upper ends of the adjustment sleeves, and after the adjustment sleeves are disposed around the paper holding blocks, upper ends of the adjustment sleeves are higher than the paper holding blocks.

Preferably, the paper shredding assembly comprises a first cutter shaft and a second cutter shaft, and the first cutter shaft and the second cutter shaft are disposed below a left side and a right side of the paper inlet respectively and are matched with each other to shred the paper entering the paper inlet.

Preferably, the paper shredder body further comprises a cover plate, a paper pressing plate, an upper cover, a lower cover, a driving motor, a shell and a wastepaper barrel;

The shell is disposed below the lower cover and is fixedly connected to the lower cover, the upper cover is fixedly connected to the lower cover, the cover plate is rotatably connected to the upper cover, the paper holder is disposed on an upper surface of an inner side of the lower cover, the curved paper box is fixedly connected to the lower cover, and the paper shredding assembly is disposed in the lower cover;

The paper pressing plate is elastically connected to a lower surface of the cover plate through a plurality of elastic parts, is opposite to an upper surface of the paper holding plate, and is used for pressing the paper on the paper holding plate when users close the cover plate;

The driving motor is disposed in the lower cover, and is connected to the paper pick-up assembly and the paper shredding assembly through a drive assembly;

The wastepaper barrel is disposed in the shell and is used for collecting paper scraps.

Preferably, the cover plate is rotatably connected to the upper cover through a rotary connector, and the rotary connector comprises a mounting base, a rotary shaft and a torsion elastic piece;

The mounting base is fixed on the cover plate through a first mounting part;

The rotary shaft is disposed at one end of the mounting base;

The torsion elastic piece is disposed around the rotary shaft, has an actuating end fixedly disposed on the rotary shaft and a fixed end fixed on the upper cover through a second mounting part, and applies an elastic force to the rotary shaft and the cover plate to enable the rotary shaft and the cover plate to rotate away from the upper cover.

Preferably, the first mounting part is a first fixing screw.

Preferably, the torsion elastic piece is a torsion spring, a first torsion arm of the torsion spring is fixedly disposed on the rotary shaft, and a second torsion arm of the torsion spring is fixed on the upper cover through the second mounting part.

Preferably, a through groove is formed in an open end of the rotary end in an axial direction, and the first torsion arm of the torsion spring is disposed in the through groove.

Preferably, the second mounting part is a second fixing screw, and the second torsion arm is fixed on the upper cover through the second fixing screw.

Compared with the prior art, the invention adopting the above technical solution has the following advantages and beneficial effects:

1. According to the invention, by disposing the paper inlet and the paper pick-up assembly on the side, away from the curved paper box, of the paper holding plate, the paper can be fed from the short side, and the end, away from the curved paper box, of the paper can be driven to enter the paper inlet. Compared with the traditional method that the paper is fed after being folded, the working time of the paper pick-up assembly can be shortened during the paper feeding process, that is, the paper pick-up assembly just needs to drive the short side of the paper to enable the paper to enter the paper inlet, and then can instantly drive the next piece of paper to enter the paper inlet, thus improving the paper shredding speed and efficiency.
2. According to the invention, the paper inlet and the paper pick-up assembly are disposed on the side, away from the curved paper box, of the paper holding plate, such that paper can be fed from the short side, thus improving the paper shredding speed; the length of the paper laid on the paper holding plate can be further decreased and the length of the paper in the curved paper box is increased, so the length of the paper holding plate and the paper shredder body is decreased, making the paper shredder body smaller. Because paper is fed from the short side rather than being folded, the flat portion of the of the paper does not need to be too long as long as one side of the paper can contact the paper pick-up assembly, that is, the flat length of the paper can be decreased and the length of the paper in the curved paper box can be increased by decreasing the length of the paper holding plate and increasing the size of the curved paper box, making the paper shredder body smaller.

3. According to the invention, the first paper holding plate and/or the second paper holding plate incline(s) downward towards the paper inlet, such that paper can be inclined and bent in the paper inlet, thus further decreasing the length of the paper laid on the paper holding plate. In addition, due to the fact that paper is inclined and bent in the paper inlet, the friction between the paper is reduced; and the friction is decomposed in the horizontal direction and vertical direction, so the paper can be fed more smoothly, and the situation where the paper pick-up assembly synchronously drives multiple pieces of paper 34 is avoided, thus preventing jams of the paper shredding assembly.
4. According to the invention, at least one paper pick-up wheel is arranged, such that the paper pick-up effect is improved.

In view of the problems in the background, the invention aims to provide a curved paper box for a paper shredder, comprising:

A main part, the main part being hollow to form a paper cavity which bends downward, and openings being formed in an upper end and a lower end of the paper cavity; and a plurality of paper holding blocks disposed on the main part side by side and located on a side provided with a lower opening of the paper cavity, first paper holding slopes being disposed at upper ends of the paper holding blocks towards the lower opening of the paper cavity; wherein paper enters the paper cavity from an upper opening of the paper cavity, and after the paper bends downward along the paper cavity, a lower end of the paper abuts against the first paper holding slopes.

Preferably, the main part comprises an upper paper guide assembly and a lower paper guide assembly which are connected, the lower paper guide assembly is provided with a linear slot which is open downward, and the paper holding blocks are disposed at a lower end of the lower paper guide assembly and are opposite to the linear slot; and the paper cavity is formed between the upper paper guide assembly and the lower paper guide assembly, the upper opening of the paper cavity is formed between an upper end of the upper paper guide assembly and an upper end of the lower paper guide assembly, and the lower opening of the paper cavity is formed in the linear slot.

Preferably, a plurality of guide reinforcing ribs is disposed on an inner wall, facing the lower paper guide assembly, of the upper paper guide assembly, and the guiding reinforcing ribs bend downward to be arc-shaped.

Preferably, the number of the guide reinforcing ribs is identical with the number of the paper holding blocks, and the guide reinforcing ribs are in one-to-one correspondence with the paper holding blocks.

Preferably, the upper paper guide assembly and the lower paper guide assembly are fixedly connected through screws.

Preferably, the curved paper box further comprises adjustment sleeves which are disposed around and fastened on the paper holding blocks, second paper holding slopes facing the lower opening of the paper cavity are disposed at upper ends of the adjustment sleeves, and after the adjustment sleeves are disposed around the paper holding blocks, the upper ends of the adjustment sleeves are higher than the paper holding blocks.

Preferably, each adjustment sleeve comprises a bottom shell and two side walls disposed on the bottom shell, and the second paper holding slopes are formed at upper ends of the side walls.

Preferably, the curved paper box comprises three paper holding blocks.

Compared with the prior art, the invention adopting the above technical solution has the following advantages and beneficial effects:

According to the invention, after paper is bent in the paper cavity, the lower end of the paper abuts against the first paper holding slopes; when multiple pieces of the paper need to be shredded, all the pieces of paper are stacked, and the lower ends of all the pieces of paper are obliquely arranged in sequence along the first paper holding slopes; because the bend angles of all the pieces of stacked paper are different and increase from bottom to top and the positions of the lower ends of the pieces of paper abutting against the first paper holding slopes become higher from bottom to top, the upper ends of all the pieces of paper can be stacked in order and will not be staggered, and the distances from the upper ends of the all the pieces of paper to a paper inlet are identical, such that the paper will not move when shredded, making paper shredding more stable and improving the success rate of paper feeding and staple removing; and through the adjustment sleeves, shorter paper can be shredded, and when the shorter paper is shredded, the paper will not move, thus improving the paper shredding stability and making the adaptability better.

In view of the problems in the background, the invention aims to provide a rotary connector for a cover plate of a paper shredder, which is used for rotatably connecting a cover plate and an upper cover of a paper shredder, and comprises a mounting base, a rotary shaft and a torsion elastic piece; the mounting base is fixed on the cover plate through a first mounting part; the rotary shaft is disposed at one end of the mounting base; and the torsion elastic piece is disposed around the rotary shaft, has an actuating end fixedly disposed on the rotary shaft and a fixed end fixed on the upper cover through a second mounting part, and applies an elastic force to the rotary shaft and the cover plate to enable the rotary shaft and the cover plate to rotate away from the upper cover.

Preferably, the first mounting part is a first fixing screw.

Preferably, the torsion elastic piece is a torsion spring, a first torsion arm of the torsion spring is fixedly disposed on the rotary shaft, and a second torsion arm of the torsion spring is fixed on the upper cover through the second mounting part.

Preferably, a through groove is formed in an open end of the rotary end in an axial direction, and the first torsion arm of the torsion spring is disposed in the through groove.

Preferably, the second mounting part is a second fixing screw, and the second torsion arm is pressed and fixed on the upper cover through the second fixing screw.

Preferably, a stud is disposed on the upper cover, and the second fixing screw is disposed on the stud.

Preferably, at least one gasket disposed around the second fixing screw.

Preferably, a side plate is disposed on the cover plate, the mounting base is disposed on an inner side of the side plate, the rotary shaft penetrates through the side plate to stretch to an outer side of the side plate, the torsion elastic piece is disposed around the rotary shaft on the outer side of the side plate, the second mounting part is disposed on the outer side of the side plate, and the fixed end of the torsion elastic piece is fixed between the second mounting part and the side plate.

Preferably, two sets of mounting bases, rotary shafts and torsion springs are disposed on two sides of one end of the cover plate respectively, and the other end of the cover plate is fastened on the upper cover through a buckle.

Compared with the prior art, the invention adopting the above technical solution has the following advantages and beneficial effects:

1. According to the invention, the cover plate is elastically and rotatably connected to the upper cover through the mounting base, the rotary shaft and the torsion spring, such that the structure is simpler and assembly is more convenient; and the mounting base and the cover plate are of a separable structure, such that the cover plate can be made easily.
2. According to the invention, by adjusting the height of the stud and the number of the gaskets, the fixing height of the second torsion arm of the torsion spring can be adjusted to adjust the elastic force applied to the cover plate by the second torsion arm, such that the elastic force for pressing the cover plate can be adjusted to be within a proper range; if the elastic force is too large, the cover plate will deform after being closed; if the elastic force is too small, the cover plate will be difficult to open.

BRIEF DESCRIPTION OF THE DRAWINGS

The specific implementation of the invention will be described in further detail below in conjunction with accompanying drawings, wherein.

DETAILED DESCRIPTION OF THE DRAWINGS

The invention will be described in further detail below in conjunction with accompanying drawings and specific embodiments. The advantages and features of the invention will be clearer with reference to the following description. It should be noted that the drawings are extremely simplified and are drawn to accurate scale to assist in explaining the purposes of the embodiments of the invention conveniently and clearly.

It should be noted that all directional indications (such as "upper", "lower", "left", "right", "front", "back") in the embodiments of the invention are merely used to explain the relative positional relation and motion condition of components at a certain pose (shown in figures), and when the pose changes, the directional indications change accordingly.

Figure 1:
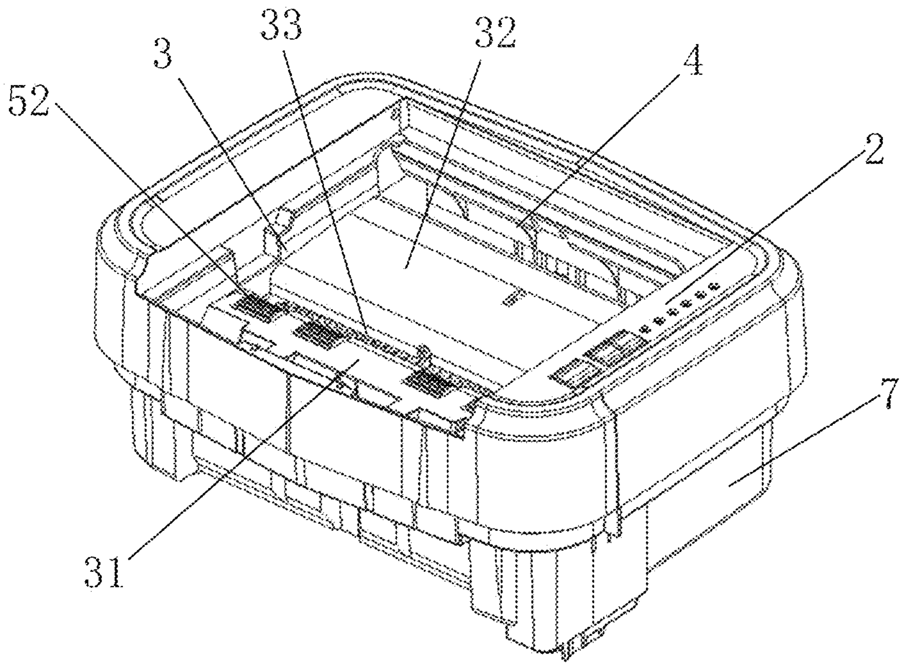
FIG. 1 is a schematic diagram of a paper shredder without a cover plate according to the invention.
Figure 2:
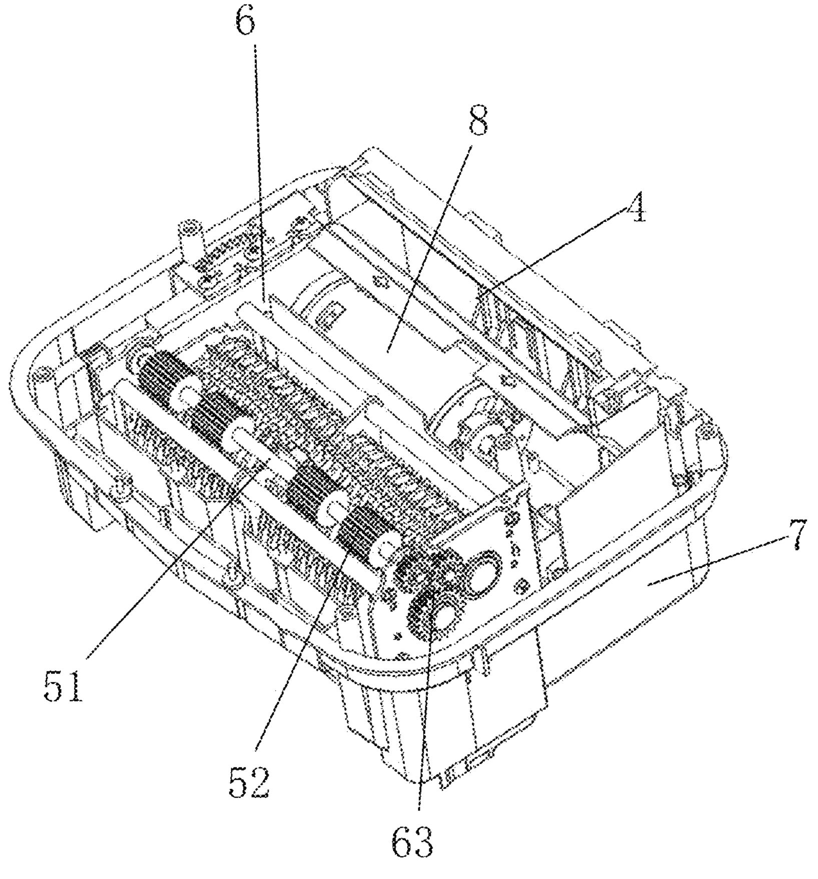
FIG. 2 is a schematic diagram of the paper shredder without a cover plate and an upper cover according to the invention.
Figure 3:
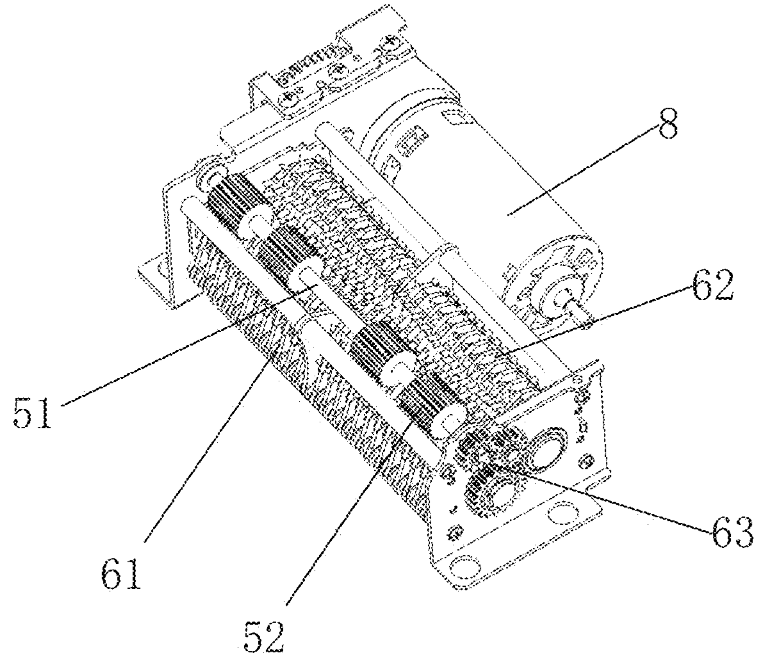
FIG. 3 is an internal view of the paper shredder according to the invention.
Figure 4:
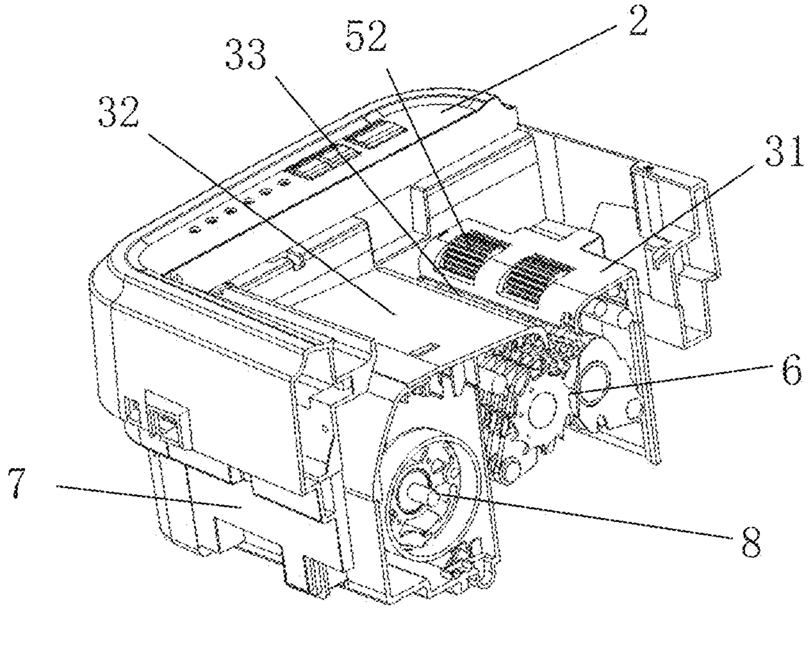
FIG. 4 is an axonometric sectional view of FIG. 1 of the paper shredder according to the invention.
Figure 5:
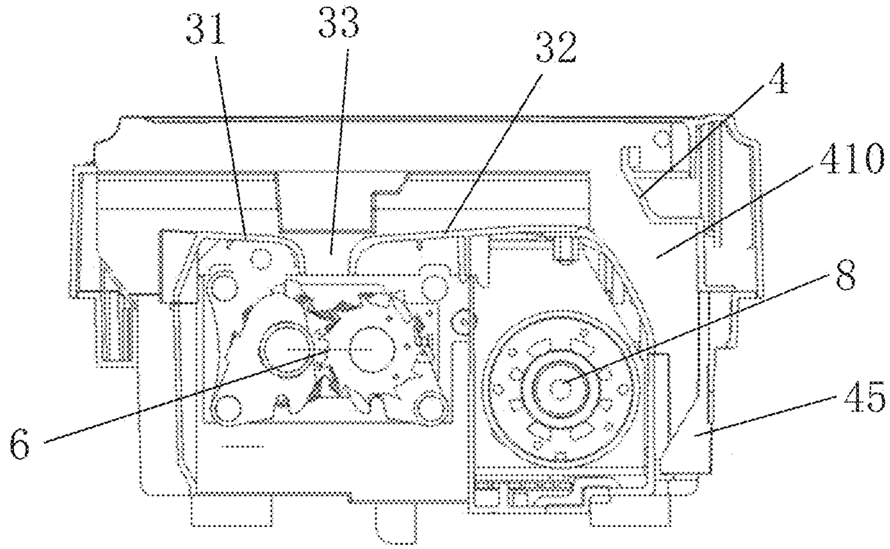
FIG. 5 is a front sectional view of the paper shredder according to the invention.
Figure 6:
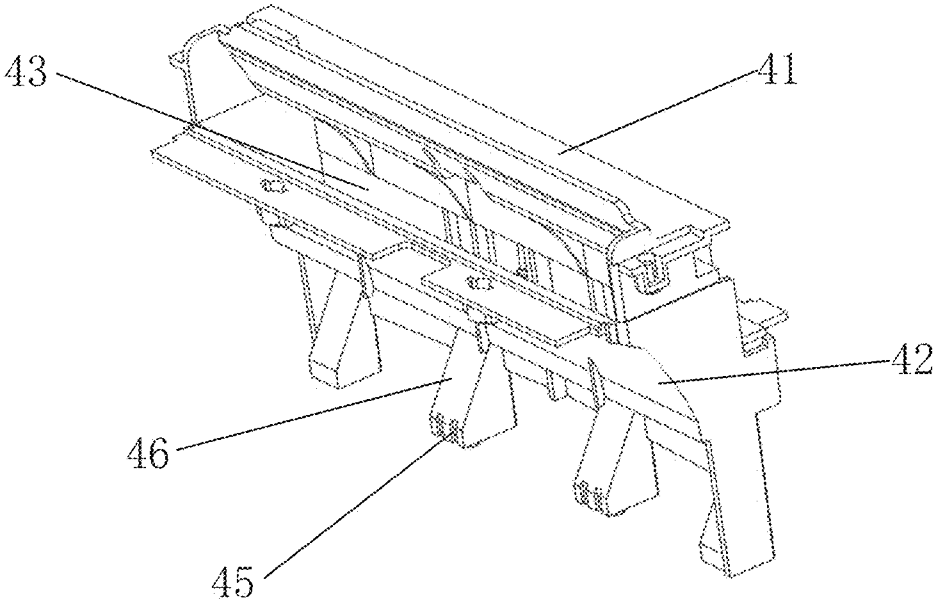
FIG. 6 is a first axonometric view of a curved paper box according to the invention.
Figure 7:
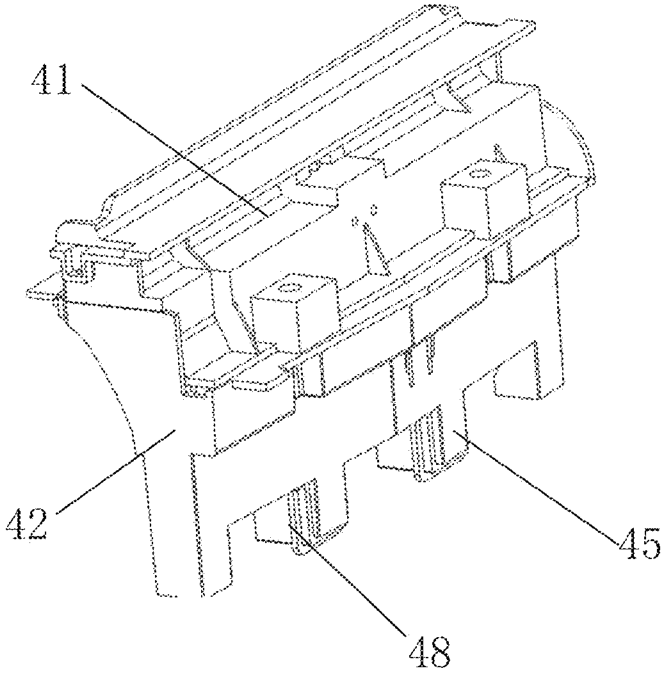
FIG. 7 is a second axonometric view of the curved paper box according to the invention.
Figure 8:
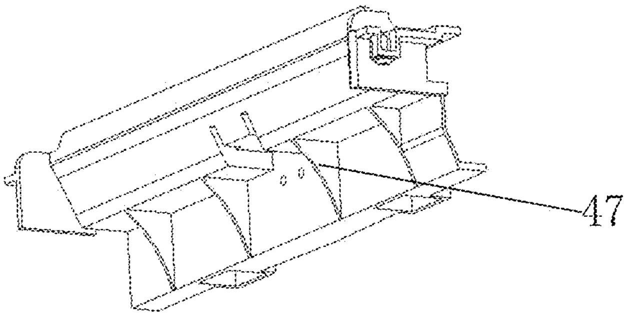
FIG. 8 is a schematic diagram of an upper paper guide assembly according to the invention.
Figure 9:
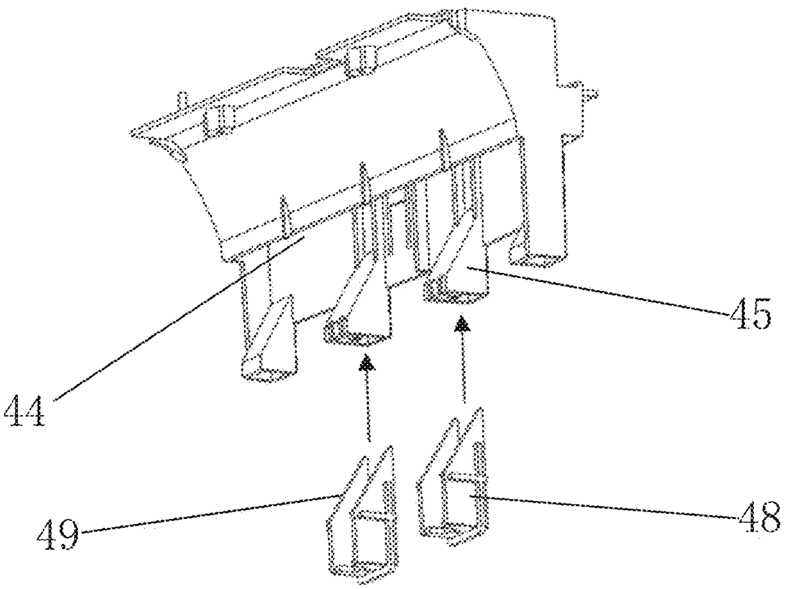
FIG. 9 is a schematic diagram of a lower paper guide assembly according to the invention.
Figure 10:
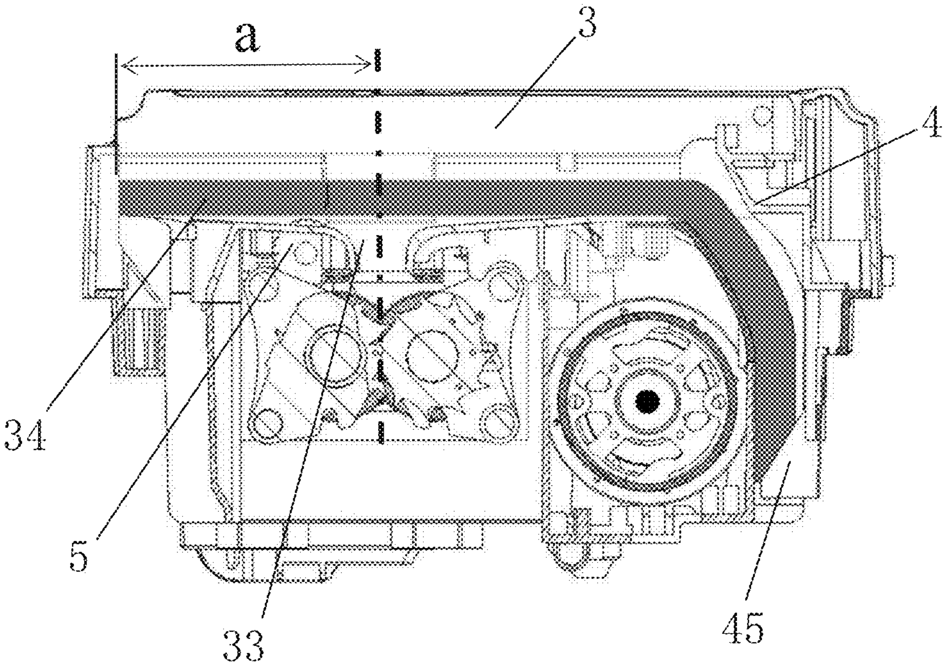
FIG. 10 is a schematic diagram of the paper shredder when paper is placed on the paper shredder according to the invention.
Figure 11:
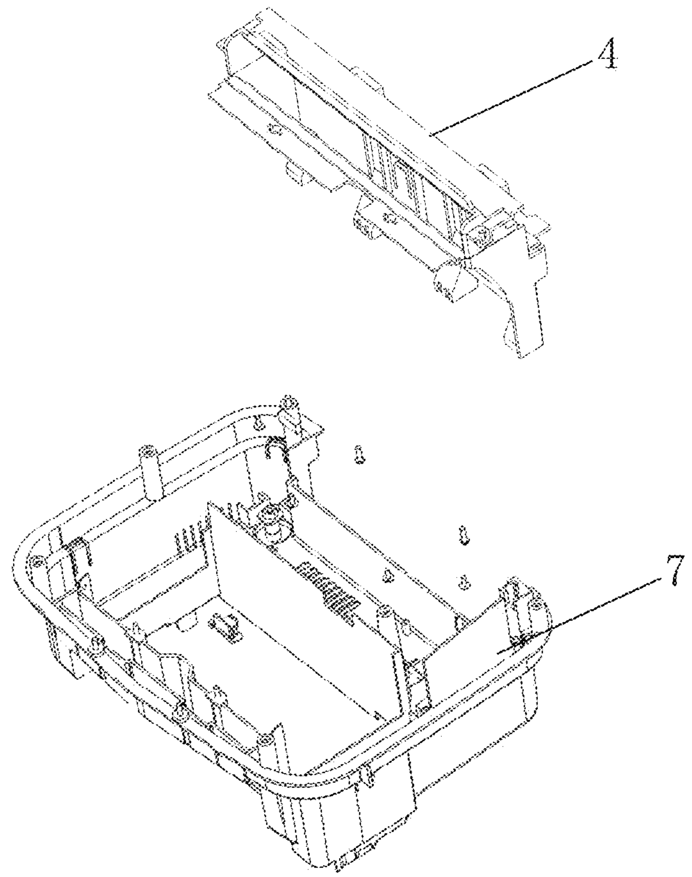
FIG. 11 is an installation diagram of the curved paper box according to the invention.
Figure 12:
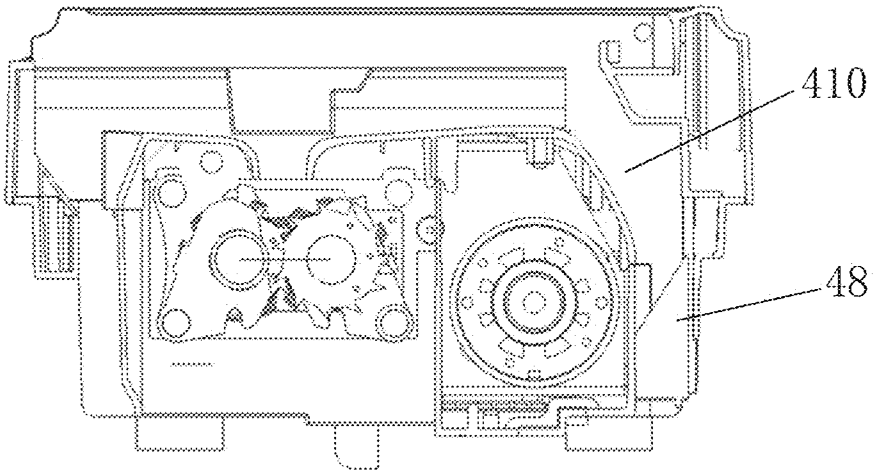
FIG. 12 is a sectional view of the paper shredder with adjustment sleeves according to the invention.
Figure 13:
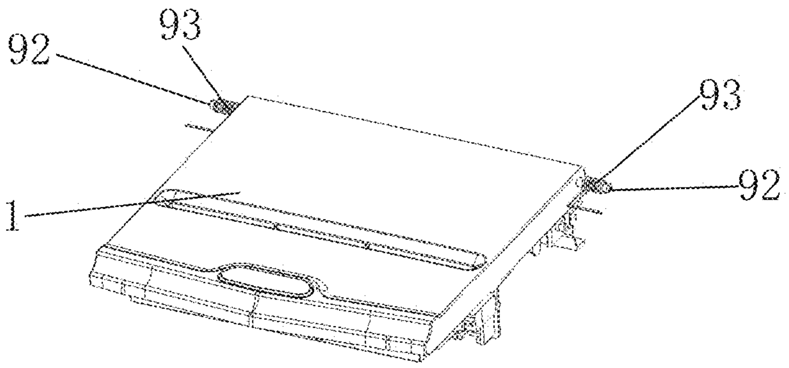
FIG. 13 is a front view of the cover plate according to the invention.
Figure 14:
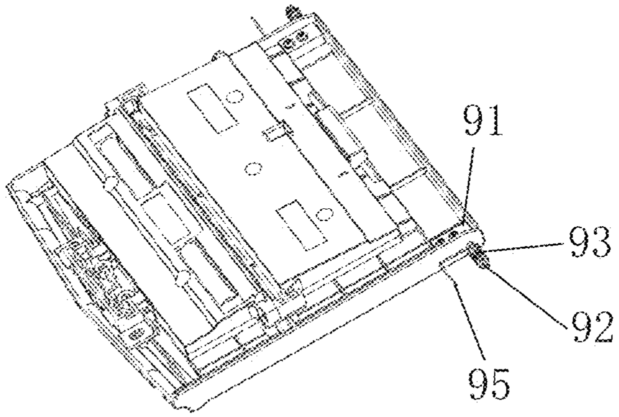
FIG. 14 is a back view of the cover plate according to the invention.
Figure 15:
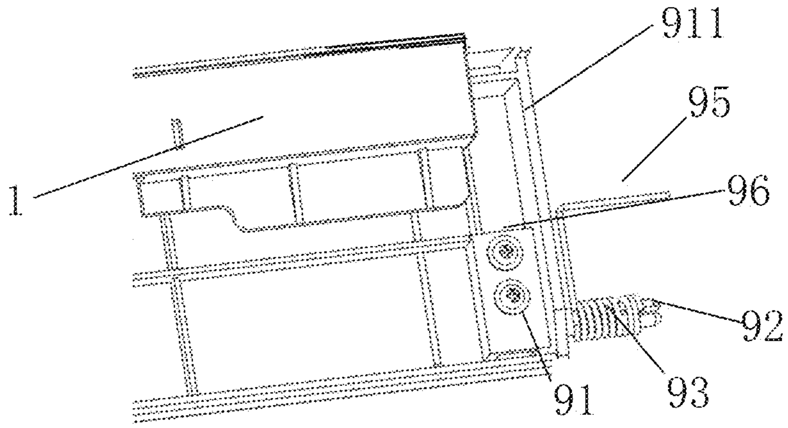
FIG. 15 is a detailed partial view of the cover plate according to the invention.
Figure 16:
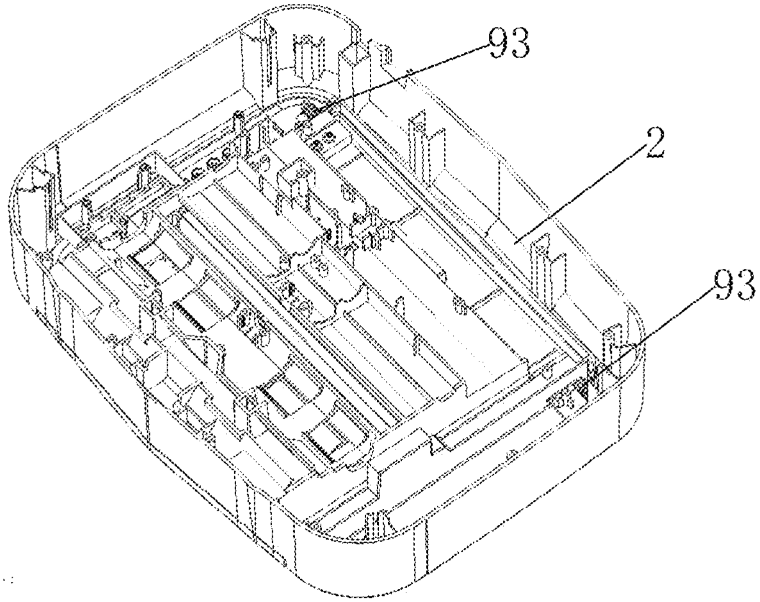
FIG. 16 is a schematic diagram of the upper cover after the cover plate is removed according to the invention.
Figure 17:
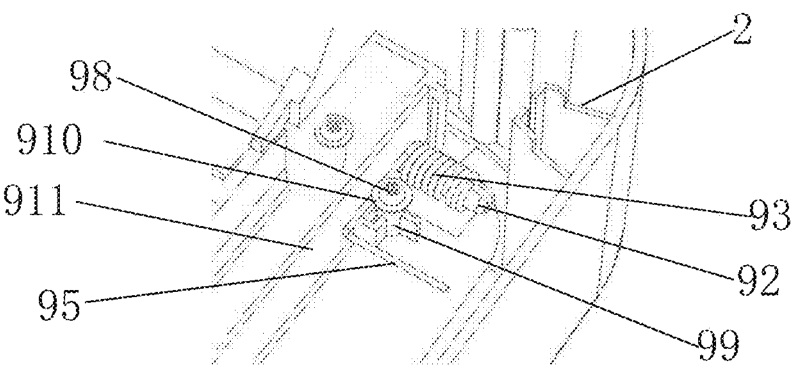
FIG. 17 is a detailed partial view of the upper cover according to the invention.
Figure 18:
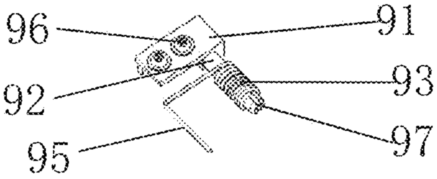
FIG. 18 is an assembled view of a mounting base, a rotary shaft and a torsion spring according to the invention.
Figure 19:
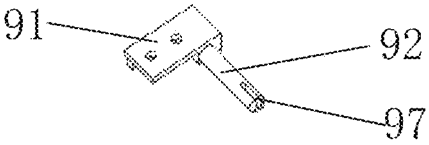
FIG. 19 is an assembled view of the mounting base and the rotary shaft according to the invention.
Figure 20:
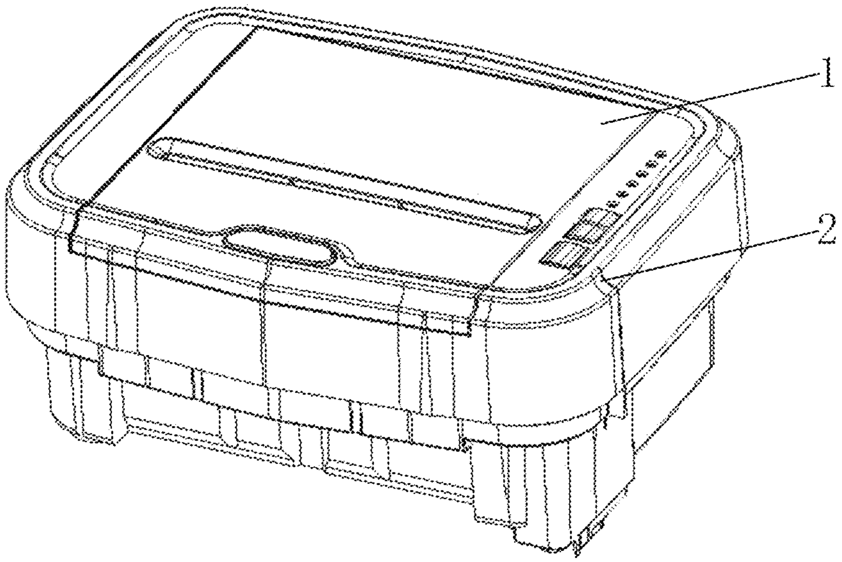
FIG. 20 is an assembled view of the cover plate and the upper cover according to the invention.

Referring to FIG. 1 to FIG. 20, the key of the invention is to provide a paper shredder capable of feeding paper laterally, comprising a paper shredder body, wherein the paper shredder body comprises a cover plate 1, a paper pressing plate, an upper cover 2, a paper holder 3, a curved paper box 4, a paper pick-up assembly 5, a paper shredding assembly 6, a lower cover 7, a driving motor 8, a shell and a wastepaper barrel.

The shell is disposed below the lower cover 7 and is fixedly connected to the lower cover 7, the upper cover 2 is fixedly connected to the lower cover 7, the cover plate 1 is rotatably connected to the upper cover 2, the paper holder 3 is disposed on an upper surface of an inner side of the lower cover 7, the curved paper box 4 is fixedly connected to the lower cover 7 and connects to the paper holder 3, and the paper shredding assembly 6 is disposed in the lower cover 7.

One end of a stack of paper 34 to be shredded is placed in the paper holder 3, the other opposite end of the stack of paper 34 is placed in the curved paper box 4, and the curved paper box 4 forces the paper 34 to bend downwards to shorten the horizontal length of the paper 34.

Specifically, a paper holding plate is disposed on an upper surface of an inner side of the paper holder 3 and is used for holding the paper 34. A paper inlet 33 is formed in a side, away from the curved paper box 4, of the paper holding plate and partitions the paper holding plate into a first paper holding plate 31 and a second paper holding plate 32, the second paper holding plate 32 is close to the curved paper box 4, the paper pick-up assembly 5 is disposed in the first paper holding plate 31 and is close to the paper inlet 33, the paper shredding assembly 6 is disposed below the paper inlet 33, and the end, away from the curved paper box 4, of the paper 34 is driven by the paper pick-up assembly 5 to enter the paper shredding assembly 6 through the paper inlet 33.

On one hand, by disposing the paper inlet 33 and the paper pick-up assembly 5 on the side, away from the curved paper box 4, of the paper holding plate, the paper 34 can be fed from the short side, and the end, away from the curved paper box 4, of the paper 34 can be driven to enter the paper inlet 33. Compared with the traditional method that the paper 34 is fed after being folded, the working time of the paper pick-up assembly 5 can be shortened during the paper 34 feeding process, that is, the paper pick-up assembly 5 just needs to drive the short side of the paper 34 to enable the paper 34 to enter the paper inlet 33, and then can instantly drive the next piece of paper 34 to enter the paper inlet 33, thus improving the paper shredding speed and efficiency.

On the other hand, by disposing the paper inlet 33 and the paper pick-up assembly 5 on the side, away from the curved paper box 4, of the paper holding plate, the paper 34 can be fed from the short side, thus improving the paper shredding speed; the length of the paper 34 laid on the paper holding plate can be further decreased and the length of the paper 34 in the curved paper box 4 is increased, so the length of the paper holding plate and the paper shredder body is decreased, making the paper shredder body smaller. Because the paper 34 is fed from the short side rather than being folded, the flat portion of the of the paper 34 does not need to be too long as long as one side of the paper 34 can contact the paper pick-up assembly 5, that is, the flat length of the paper 34 can be decreased and the length of the paper 34 in the curved paper box 4 can be increased by decreasing the length of the paper holding plate and increasing the size of the curved paper box 4, making the paper shredder body smaller.

Further, the first paper holding plate 31 and/or the second paper holding plate 32 incline(s) downward towards the paper inlet 33. In this embodiment, the first paper holding plate 31 and the second holding plate 32 both incline downwards towards the paper inlet 33. In other embodiments, other settings may be used.

The first paper holding plate 31 and/or the second paper holding plate 32 incline(s) downward towards the paper inlet 33, such that the paper 34 can be inclined and bent in the paper inlet 33, thus further decreasing the length of the paper 34 laid on the paper holding plate. In addition, due to the fact that the paper 34 is inclined and bent in the paper inlet 33, the friction between the paper 34 is reduced; and the friction is decomposed in the horizontal direction and vertical direction, so the paper can be fed more smoothly, and the situation where the paper pick-up assembly synchronously drives multiple pieces of paper 34 is avoided, thus preventing jams of the paper shredding assembly 6.

The paper pressing plate is elastically connected to a lower surface of the cover plate 1 through a plurality of elastic parts, is opposite to an upper surface of the paper holding plate, and is used for pressing the paper 34 on the paper holding plate when users close the cover plate 1.

The paper pick-up assembly 5 comprises a paper pick-up wheel shaft 51 and paper pick-up wheels 52 disposed on the paper pick-up wheel shaft 51, the paper pick-up wheel shaft 51 is arranged in a length direction of the paper inlet 33, and the paper pick-up wheels 52 are disposed in paper 34 pick-up holes formed in the first paper holding plate 31 and partially protrude out of an upper surface of the first paper holding plate 31.

In this embodiment, the paper pick-up assembly 5 comprises at least one paper pick-up wheel 52, and specifically, the paper pick-up assembly 5 comprises four paper pick-up wheels 52, such that the paper pick-up effect can be improved. In other embodiments, the paper pick-up assembly 5 may comprise other numbers of paper pick-up wheels 52. The invention has no limitation in this aspect.

The paper shredding assembly 6 is disposed in the lower cover 7 and comprises a first cutter shaft 61 and a second cutter shaft 62, and the first cutter shaft 61 and the second cutter shaft 62 are disposed below a left side and a right side of the paper inlet 33 respectively and are matched with each other to shred the paper 34 entering the paper inlet 33.

The driving motor 8 is disposed in the lower cover 7 and is connected to the paper pick-up assembly 5 and the paper shredding assembly 6 through a drive assembly 63, and the drive assembly 63 is composed of a plurality of drive gears and drives the paper pick-up assembly 5 and the paper shredding assembly 6 to operate at the same time.

The curved paper box 4 comprises a main part and a plurality of paper holding blocks 45. The main part is hollow to form a paper cavity 410 which bends downward, and openings are formed in an upper end and a lower end of the paper cavity 410. The plurality of paper holding blocks 45 are disposed on the main part side by side and are located on a side provided with a lower opening 44 of the paper cavity 410, first paper holding slopes 46 are disposed at upper ends of the paper holding blocks 45 towards the lower opening 44 of the paper cavity 410, and the first paper holding slopes 46 face an upper opening 43 of the paper cavity 410. In this embodiment, the curved paper box 4 comprises three paper holding blocks 45. The number of the paper holding blocks 45 is not limited and can be adjusted according to the actual condition.

Specifically, the main part comprises an upper paper guide assembly 41 and a lower paper guide assembly 42 which are connected through screws. The upper paper guide assembly 41 is disposed above the lower paper guide assembly 42. The lower paper guide assembly 42 is provided with a linear slot which is open downward, and the paper holding blocks 45 are disposed at a lower end of the lower paper guide assembly 42 and are opposite to the linear slot. The paper cavity 410 is formed between the upper paper guide assembly 41 and the lower paper guide assembly 42, the upper opening 43 of the paper cavity 410 is formed between an upper end of the upper paper guide assembly 41 and an upper end of the lower paper guide assembly 42, and the lower opening 44 of the paper cavity 410 is formed in the linear slot.

A plurality of guide reinforcing ribs 47 are disposed on an inner wall, facing the lower paper guide assembly 42, of the upper paper guide assembly 41, and the guiding reinforcing ribs 47 bend downward to be arc-shaped. The guide reinforcing ribs 47 not only can guide the paper 34, but also can improve the strength of the upper paper guide assembly 41. The number of the guide reinforcing ribs 47 is identical with the number of the paper holding blocks 45, and the guide reinforcing ribs 47 are in one-to-one correspondence with the paper holding blocks 45. In this embodiment, the number of the guide reinforcing ribs 47 and the number of the paper holding blocks 45 are three.

The paper 34 enters the paper cavity 410 from the upper opening 43 of the paper cavity 410, and after the paper 410 bends downward along the paper cavity 410, a lower end of the paper 34 abuts against the first paper holding slopes 46.

When multiple pieces of the paper 34 need to be shredded, all the pieces of paper 34 are stacked, and the lower ends of all the pieces of paper 34 are obliquely arranged in sequence along the first paper holding slopes 46. Because the bend angles of all the pieces of stacked paper 34 are different and increase from bottom to top and the positions of the lower ends of the pieces of paper abutting against the first paper holding slopes 46 become higher from bottom to top, the upper ends of all the pieces of paper can be stacked in order and will not be staggered, that is, the distances a from the upper ends of the all the pieces of paper to the paper inlet are identical, the lower end of the paper clings to the first paper holding slopes 46, and the upper end of the paper clings to the side wall of the paper holder 5, so when one piece of paper 34 is driven by the paper pick-up wheels 52 to enter the paper inlet 33 to be shredded, the other pieces of paper

34 will not move, making paper shredding more stable and improving the success rate of paper feeding and staple removing.

Preferably, the paper shredder further comprises adjustment sleeves 48 which are disposed around and fastened on the paper holding blocks 45, second paper holding slopes 49 facing the lower opening 44 of the paper cavity 410 are disposed at upper ends of the adjustment sleeves 48, and after the adjustment sleeves 48 are disposed around the paper holding blocks 45, the upper ends of the adjustment sleeves 48 are higher than the paper holding blocks 45. Specifically, each adjustment sleeve 48 comprises a bottom shell and two side walls disposed on the bottom shell, and the second paper holding slopes 49 are formed at upper ends of the side walls. Through the adjustment sleeves 48, shorter paper 34 can be shredded; when the shorter paper 34 is shredded, the upper end of the paper 34 can be picked up by the paper pick-up wheels 52, and the paper 34 will not move, thus improving the paper shredding stability and making the adaptability better. The height of the adjustment sleeves 48 can be adaptively adjusted according to the length of the paper 34, and the invention has not limitation in this aspect. According to an improved solution, the adjustment sleeves 48 may be slidably mounted on the paper holding blocks 45, such that the height of the second paper holding slopes 49 can be adjusted in real time to adapt to paper 34 of different lengths.

The cover plate 1 is rotatably connected to the upper cover 2 through a rotary connector, and the rotary connector comprises a mounting base 91, a rotary shaft 92 and a torsion elastic piece.

The mounting base 91 is fixed on the cover plate 1 through a first mounting part. In this embodiment, the first mounting part is a first fixing screw 96, and the mounting base 91 is mounted on the cover plate 1 through two first fixing screws 96. The form of the first mounting part and the number of the first fixing screws 96 are not limited, and the first mounting part may be a buckle or other structures and is mainly used for detachably connecting the mounting base 91 and the cover plate 1 to realize a separable structure of the mounting base 91 and the cover plate 1, such that the cover plate 1 can be made easily.

The rotary shaft 92 is disposed at one end of the mounting base 91, a side plate 911 is disposed on the cover plate 1, the mounting base 91 is disposed on an inner side of the side plate 911, and the rotary shaft 92 penetrates through the side plate 911 to stretch to an outer side of the side plate 911.

The torsion elastic piece is disposed around the rotary shaft 92 on the outer side of the side plate 911, an actuating end of the torsion elastic piece is fixedly disposed on the rotary shaft 92, and a fixed end of the torsion elastic piece is fixed on the upper cover 2 through a second mounting part. In this embodiment, the second mounting part is disposed on the outer side of the side plate 911, and the fixed end of the torsion elastic piece is fixed between the second mounting part and the side plate 911. The torsion elastic piece applies an elastic force to the rotary shaft 92 and the cover plate 1 to enable the rotary shaft 92 and the cover plate 1 to rotate away from the upper cover 2.

Through the connection of the mounting base 91, the rotary shaft 92 and the torsion elastic piece, the cover plate 1 is rotatably connected to the upper cover 2, and the cover plate 1 can bounce automatically through the torsion elastic piece after being opened.

Specifically, the torsion elastic piece is a torsion spring 93, a first torsion arm 94 of the torsion spring 93 is fixedly disposed on the rotary shaft 92, and a second torsion arm 95 of the torsion spring 93 is fixed on the upper cover 2 through the second mounting part. Preferably, a through groove 97 is formed in an open end of the rotary shaft 92 in an axial direction, and the first torsion arm 94 of the torsion spring 93 is clamped in the through groove 97 to be fixedly disposed on the rotary shaft 92. The second mounting part is a second fixing screw 98, and the second torsion arm 95 is pressed and fixed on the upper cover 2 through the second fixing screw 98.

A stud 99 is disposed on the upper cover 2, and the second fixing screw 98 is disposed on the stud 99. At least one gasket 910 is disposed around the second fixing screw 98. By adjusting the height of the stud 99 and the number of the gaskets 910, the fixing height of the second torsion arm 95 of the torsion spring 93 can be adjusted to adjust the elastic force applied to the cover plate 1 by the second torsion arm 95, such that the elastic force for pressing the cover plate 1 can be adjusted to be within a proper range. If the elastic force is too large, the cover plate 1 will deform after being closed. If the elastic force is too small, the cover plate 1 will be difficult to open.

In this embodiment, two sets of mounting bases 91, rotary shafts 92 and torsion springs 93 are disposed on two sides of one end of the cover plate 1 respectively, such that the cover plate 1 can be elastically and rotatably connected to the upper cover 2; and the other end of the cover plate 1 is fastened on the upper cover 2 through a buckle. After being manually opened, the cover plate 1 can bounce automatically by means of the elastic force of the torsion spring 93.

According to the invention, the cover plate 1 is elastically and rotatably connected to the upper cover 2 through the mounting base 91, the rotary shaft 92 and the torsion spring 93, such that the structure is simpler and assembly is more convenient.

The wastepaper barrel is disposed in the shell and is used for collecting paper scraps.

The implementation of the invention is described in detail above in conjunction with accompanying drawings, but the invention is not limited to the above implementation. Various transformations of the invention made within the scope of the claims of the invention and their equivalents should also fall within the protection scope of the invention.

LIST OF REFERENCE NUMERALS

1 cover plate
2 upper cover
3 paper holder
31 first paper holding plate
32 second paper holding plate
33 paper inlet
34 paper
4 curved paper box
41 upper paper guide assembly
42 lower paper guide assembly
43 upper opening
44 lower opening
45 paper holding block
46 first paper holding slope
47 guide reinforcing rib
48 adjustment sleeve
49 second paper holding slope
410 paper cavity
5 paper pick-up assembly
51 paper pick-up wheel shaft
52 paper pick-up wheel
6 paper shredding assembly

61 first cutter shaft
62 second cutter shaft
63 drive assembly
7 lower cover
8 driving motor
91 mounting base
92 rotary shaft
93 torsion spring
94 first torsion arm
95 second torsion arm
96 first fixing screw
97 through groove
98 second fixing screw
99 stud
910 gasket
911 side plate Additional embodiments of the invention are described in the following:

Embodiment 1. A paper shredder capable of feeding paper 34 laterally, comprising:

a paper shredder body, wherein the paper shredder body is provided with a paper holder 3, a curved paper box 4, a paper pick-up assembly 5 and a paper shredding assembly 6; wherein the paper holder 3 connects to the curved paper box 4, one end of a stack of paper 34 to be shredded is placed in the paper holder 3, and the other opposite end of the stack of paper 34 is placed in the curved paper box 4;

a paper holding plate 31, 32 is disposed on an upper surface of an inner side of the paper holder 3 and is used for holding the paper; a paper inlet 33 is formed in a side, away from the curved paper box 4, of the paper holding plate 31, 32 and partitions the paper holding plate 31, 32 into a first paper holding plate 31 and a second paper holding plate 32, the second paper holding plate 32 is close to the curved paper box 4, and the first paper holding plate 31 and/or the second paper holding plate 32 inclines downwards toward the paper inlet 33; and the paper pick-up assembly 5 is disposed in the first paper holding plate 31 and is close to the paper inlet 33, the paper shredding assembly 6 is disposed below the paper inlet 33, and the end, away from the curved paper box 4, of the paper 34 is driven by the paper pick-up assembly 5 to enter the paper shredding assembly 6 through the paper inlet 33.

Embodiment 2. The paper shredder capable of feeding paper 34 laterally according to Embodiment 1, wherein the curved paper box 4 comprises:

a main part, the main part being hollow to form a paper cavity 410 which bends downwards, and openings being formed in an upper end and a lower end of the paper cavity 410; and a plurality of paper holding blocks 45 disposed on the main part side by side and located on a side provided with a lower opening of the paper cavity 410, first paper holding slopes 46 being disposed at upper ends of the paper holding blocks 45 towards the lower opening of the paper cavity 410;

the paper 34 enters the paper cavity 410 from an upper opening 43 of the paper cavity 410, and after the paper 34 bends downwards along the paper cavity 410, a lower end of the paper 34 abuts against the first paper holding slopes 46.

Embodiment 3. The paper shredder capable of feeding paper 34 laterally according to Embodiment 1 or 2, wherein the main part comprises an upper paper guide assembly 41 and a lower paper guide assembly 42 which are connected, the lower paper guide assembly 42 is provided with a linear slot providing an opening in downward direction, and the paper holding blocks 45 are disposed at a lower end of the lower paper guide assembly 42 and are opposite to the linear slot;

the paper cavity 410 is formed between the upper paper guide assembly 41 and the lower paper guide assembly 42, the upper opening 43 of the paper cavity 410 is formed between an upper end of the upper paper guide assembly 41 and an upper end of the lower paper guide assembly 42, and the lower opening of the paper cavity 410 is formed in the linear slot.

Embodiment 4. The paper shredder capable of feeding paper 34 laterally according to one of the preceding embodiments, wherein the paper pick-up assembly 5 comprises a paper pick-up wheel shaft 51 and a paper pick-up wheel 52 disposed on the paper pick-up wheel shaft 51, the paper pick-up wheel shaft 51 is arranged in a lengthwise direction of the paper inlet 33, and the paper pick-up wheel 52 is disposed in a paper pick-up hole formed in the first paper holding plate 31 and partially protrudes out of an upper surface of the first paper holding plate 31.

Embodiment 5. The paper shredder capable of feeding paper 34 laterally according to embodiment 4, wherein the paper pick-up assembly 5 comprises at least one paper pick-up wheel 52.

Embodiment 6. The paper shredder capable of feeding paper 34 laterally according to embodiment 2, wherein the paper shredder further comprises adjustment sleeves 48 disposed around and fastened on the paper holding blocks 45, wherein second paper holding slopes 49 facing the lower opening of the paper cavity 410 are disposed at upper ends of the adjustment sleeves 48, and after the adjustment sleeves 48 are disposed around the paper holding blocks 45, upper ends of the adjustment sleeves 48 are higher than the paper holding blocks 45.

Embodiment 7. The paper shredder capable of feeding paper 34 laterally according to one of the preceding embodiments, wherein the paper shredding assembly 6 comprises a first cutter shaft 61 and a second cutter shaft 62, and the first cutter shaft 61 and the second cutter shaft 62 are disposed below a left side and a right side of the paper inlet 33 respectively and are matched with each other to shred the paper 34 entering the paper inlet 33.

Embodiment 8. The paper shredder capable of feeding paper 34 laterally according to one of the preceding embodiments, wherein the paper shredder body further comprises a cover plate 1, a paper pressing plate, an upper cover 2, a lower cover 7, a driving motor 8, a shell and a wastepaper barrel;

the shell is disposed below the lower cover 7 and is fixedly connected to the lower cover 7, the upper cover 2 is fixedly connected to the lower cover 7, the cover plate 1 is rotatably connected to the upper cover 2, the paper holder 3 is disposed on an upper surface of an inner side of the lower cover 7, the curved paper box 4 is fixedly connected to the lower cover 7, and the paper shredding assembly 6 is disposed in the lower cover 7;

the paper pressing plate is elastically connected to a lower surface of the cover plate 1 through a plurality of elastic parts, is opposite to an upper surface of the paper holding plate 31, 32, and is used for pressing the paper 34 on the paper holding plate 31, 32 when users close the cover plate 1;

the driving motor 8 is disposed in the lower cover 7, and is connected to the paper pick-up assembly 5 and the paper shredding assembly 6 through a drive assembly 63;

the wastepaper barrel is disposed in the shell and is used for collecting paper scraps.

Embodiment 9. The paper shredder capable of feeding paper 34 laterally according to embodiment 8, wherein the cover plate 1 is rotatably connected to the upper cover 2 through a rotary connector, and the rotary connector comprises a mounting base 91, a rotary shaft 92 and a torsion elastic piece;

the mounting base 91 is fixed on the cover plate 1 through a first mounting part;

the rotary shaft 92 is disposed at one end of the mounting base 91;

the torsion elastic piece is disposed around the rotary shaft 92, has an actuating end fixedly disposed on the rotary shaft 92 and a fixed end fixed on the upper cover 2 through a second mounting part, and applies an elastic force to the rotary shaft 92 and the cover plate 1 to enable the rotary shaft 92 and the cover plate 1 to rotate away from the upper cover 2.

Embodiment 10. The paper shredder capable of feeding paper 34 laterally according to embodiment 9, wherein the first mounting part is a first fixing screw 96.

Embodiment 11. The paper shredder capable of feeding paper 34 laterally according to embodiment 9 or 10, wherein the torsion elastic piece is a torsion spring 93, a first torsion arm 94 of the torsion spring 93 is fixedly disposed on the rotary shaft 92, and a second torsion arm 95 of the torsion spring 93 is pressed and fixed on the upper cover 2 through the second mounting part.

Embodiment 12. The paper shredder capable of feeding paper 34 laterally according to embodiment 11, wherein a through groove 97 is formed in an open end of the rotary end in an axial direction, and the first torsion arm 94 of the torsion spring 93 is disposed in the through groove 97.

Embodiment 13. The paper shredder capable of feeding paper 34 laterally according to embodiment 11 or 12, wherein the second mounting part is a second fixing screw 98, and the second torsion arm 95 is fixed on the upper cover 2 through the second fixing screw 98.

Embodiment 14. A curved paper box 4 for a paper shredder, comprising:

a main part, the main part being hollow to form a paper cavity 410 which bends downwards, and openings 43, 44 being formed in an upper end and a lower end of the paper cavity 410; and a plurality of paper holding blocks 45 disposed on the main part side by side and located on a side provided with a lower opening of the paper cavity 410, first paper holding slopes 46 being disposed at upper ends of the paper holding blocks 45 towards the lower opening of the paper cavity 410;

wherein said curved paper box 4 is shaped to bend paper 34 entering the paper cavity 410 from an upper opening 43 of the paper cavity 410 downwards along the paper cavity 410 and have a lower end of the paper abut against the first paper holding slopes 46.

Embodiment 15. The curved paper box 4 for a paper shredder according to embodiment 14, wherein the main part comprises an upper paper guide assembly 41 and a lower paper guide assembly 42 which are connected, the lower paper guide assembly 42 is provided with a linear slot providing an opening in downward direction, and the paper holding blocks 45 are disposed at a lower end of the lower paper guide assembly 42 and are opposite to the linear slot;

the paper cavity 410 is formed between the upper paper guide assembly 41 and the lower paper guide assembly 42, the upper opening 43 of the paper cavity 410 is formed between an upper end of the upper paper guide assembly 41 and an upper end of the lower paper guide assembly 42, and the lower opening of the paper cavity 410 is formed in the linear slot.

Embodiment 16. The curved paper box 4 for a paper shredder according to embodiment 15, wherein a plurality of guide reinforcing ribs 47 are disposed on an inner wall of the upper paper guide assembly 41, facing the lower paper guide assembly 42, said guiding reinforcing ribs 47 bending downwards in an arc-shaped fashion.

Embodiment 17. The curved paper box 4 for a paper shredder according to embodiment 16, wherein the number of the guide reinforcing ribs 47 is identical with the number of the paper holding blocks 45, and the guide reinforcing ribs 47 are in one-to-one correspondence with the paper holding blocks 45.

Embodiment 18. The curved paper box 4 for a paper shredder according to one of embodiments 15-17, wherein the upper paper guide assembly 41 and the lower paper guide assembly 42 are fixedly connected through screws.

Embodiment 19. The curved paper box 4 for a paper shredder according to one of embodiments 14-18, wherein the curved paper box 4 further comprises adjustment sleeves 48 which are disposed around and fastened on the paper holding blocks 45, second paper holding slopes 49 facing the lower opening of the paper cavity 410 are disposed at upper ends of the adjustment sleeves 48, and after the adjustment sleeves 48 are disposed around the paper holding blocks 45, the upper ends of the adjustment sleeves 48 are higher than the paper holding blocks 45.

Embodiment 20. The curved paper box 4 for a paper shredder according to embodiment 19, wherein each said adjustment sleeve 48 comprises a bottom shell and two side walls disposed on the bottom shell, and the second paper holding slopes 49 are formed at upper ends of the side walls.

Embodiment 21. The curved paper box 4 for a paper shredder according to one of embodiments 14-20, wherein the curved paper box 4 comprises three paper holding blocks 45.

Embodiment 22. A rotary connector for a cover plate 1 of a paper shredder, being used for rotatably connecting a cover plate 1 and an upper cover 2 of a paper shredder, wherein the rotary connector comprises a mounting base 91, a rotary shaft 92 and a torsion elastic piece;

the mounting base 91 is fixed on the cover plate 1 through a first mounting part;

the rotary shaft 92 is disposed at one end of the mounting base 91; and the torsion elastic piece is disposed around the rotary shaft 92, has an actuating end fixedly disposed on the rotary shaft 92 and a fixed end fixed on the upper cover 2 through a second mounting part, and applies an elastic force to the rotary shaft 92 and the cover plate 1 to enable the rotary shaft 92 and the cover plate 1 to rotate away from the upper cover 2.

Embodiment 23. The rotary connector for a cover plate 1 of a paper shredder according to embodiment 22, wherein the first mounting part is a first fixing screw 96.

Embodiment The rotary connector for a cover plate 1 of a paper shredder according to embodiment 22 or 23, wherein the torsion elastic piece is a torsion spring 93, a first torsion arm 94 of the torsion spring 93 is fixedly disposed on the rotary shaft 92, and a second torsion arm 95 of the torsion spring 93 is fixed on the upper cover 2 through the second mounting part.

Embodiment 25. The rotary connector for a cover plate 1 of a paper shredder according to embodiment 24, wherein a through groove 97 is formed in an open end of the rotary end in an axial direction, and the first torsion arm 94 of the torsion spring 93 is disposed in the through groove 97.

Embodiment 26. The rotary connector for a cover plate 1 of a paper shredder according to embodiment 24 or 25, wherein the second mounting part is a second fixing screw 98, and the second torsion arm 95 is pressed and fixed on the upper cover 2 through the second fixing screw 98.

Embodiment 27. The rotary connector for a cover plate 1 of a paper shredder according to embodiment 26, wherein a stud 99 is disposed on the upper cover 2, and the second fixing screw 98 is disposed on the stud 99.

Embodiment 28. The rotary connector for a cover plate 1 of a paper shredder according to embodiment 26 or 27, wherein at least one gasket 910 disposed around the second fixing screw 98.

Embodiment 29. The rotary connector for a cover plate 1 of a paper shredder according to one of embodiments 22-28, wherein a side plate 911 is disposed on the cover plate 1, the mounting base 91 is disposed on an inner side of the side plate 911, the rotary shaft 92 penetrates through the side plate 911 to stretch to an outer side of the side plate 911, the torsion elastic piece is disposed around the rotary shaft 92 on the outer side of the side plate 911, the second mounting part is disposed on the outer side of the side plate 911, and the fixed end of the torsion elastic piece is fixed between the second mounting part and the side plate 911.

Embodiment 30. The rotary connector for a cover plate 1 of a paper shredder according to embodiment 24 or 25, wherein two sets of said mounting bases 91, said rotary shafts 92 and said torsion springs 93 are disposed on two sides of one end of the cover plate 1 respectively, and the other end of the cover plate 1 is fastened on the upper cover 2 through a buckle.

What is claimed is:

1. A paper shredder capable of feeding paper laterally, comprising:

a paper shredder body, wherein the paper shredder body is provided with a paper holder, a curved paper box, a paper pick-up assembly and a paper shredding assembly; wherein the paper holder connects to the curved paper box, wherein a first end of a stack of paper to be shredded is placed in the paper holder, and a second end of the stack of paper that is opposite to said first end is placed in the curved paper box;

a paper holding plate is disposed on an upper surface of an inner side of the paper holder and is used for holding the paper; a paper inlet is formed in a side, away from the curved paper box, of the paper holding plate and partitions the paper holding plate into a first paper holding plate and a second paper holding plate, the second paper holding plate is close to the curved paper box, and the first paper holding plate and/or the second paper holding plate incline downwards toward the paper inlet; and the paper pick-up assembly is disposed in the first paper holding plate and is close to the paper inlet, the paper shredding assembly is disposed below the paper inlet, and at the first end of the stack of paper, away from the curved paper box, the paper is driven by the paper pick-up assembly to enter the paper shredding assembly through the paper inlet; wherein the curved paper box comprises:

a main part, the main part being hollow to form a paper cavity which bends downwards, and openings being formed in an upper end and a lower end of the paper cavity; and a plurality of paper holding blocks disposed on the main part side by side and located on a side provided with a lower opening of the paper cavity, first paper holding slopes being disposed at upper ends of the paper holding blocks towards the lower opening of the paper cavity;

the paper enters the paper cavity from an upper opening of the paper cavity, and after the paper bends downwards along the paper cavity, a lower end of the paper abuts against the first paper holding slopes;

wherein the paper shredder further comprises adjustment sleeves disposed around and fastened on the paper holding blocks, wherein second paper holding slopes facing the lower opening of the paper cavity are disposed at upper ends of the adjustment sleeves, and after the adjustment sleeves are disposed around the paper holding blocks, upper ends of the adjustment sleeves are higher than the paper holding blocks.

2. The paper shredder capable of feeding paper laterally according to claim 1, wherein the main part comprises an upper paper guide assembly and a lower paper guide assembly which are connected, the lower paper guide assembly is provided with a linear slot providing an opening in downward direction, and the paper holding blocks are disposed at a lower end of the lower paper guide assembly and are opposite to the linear slot;

the paper cavity is formed between the upper paper guide assembly and the lower paper guide assembly, the upper opening of the paper cavity is formed between an upper end of the upper paper guide assembly and an upper end of the lower paper guide assembly, and the lower opening of the paper cavity is formed in the linear slot.

3. The paper shredder capable of feeding paper laterally according to claim 1, wherein the paper pick-up assembly comprises a paper pick-up wheel shaft and at least one paper pick-up wheel disposed on the paper pick-up wheel shaft, the paper pick-up wheel shaft is arranged in a lengthwise direction of the paper inlet, and the at least one paper pick-up wheel is disposed in a paper pick-up hole formed in the first paper holding plate and partially protrudes out of an upper surface of the first paper holding plate.

4. The paper shredder capable of feeding paper laterally according to claim 1, wherein the paper shredding assembly comprises a first cutter shaft and a second cutter shaft, and the first cutter shaft and the second cutter shaft are disposed below a left side and a right side of the paper inlet respectively and are matched with each other to shred the paper entering the paper inlet.

5. The paper shredder capable of feeding paper laterally according to claim 1, wherein the paper shredder body further comprises a cover plate, a paper pressing plate, an upper cover, a lower cover, a driving motor, a shell and a wastepaper barrel;

the shell is disposed below the lower cover and is fixedly connected to the lower cover, the upper cover is fixedly connected to the lower cover, the cover plate is rotatably connected to the upper cover, the paper holder is disposed on an upper surface of an inner side of the lower cover, the curved paper box is fixedly connected to the lower cover, and the paper shredding assembly is disposed in the lower cover;

the paper pressing plate is elastically connected to a lower surface of the cover plate through a plurality of elastic parts, is opposite to an upper surface of the paper holding plate, and is used for pressing the paper on the paper holding plate when users close the cover plate;

the driving motor is disposed in the lower cover, and is connected to the paper pick-up assembly and the paper shredding assembly through a drive assembly;

the wastepaper barrel is disposed in the shell and is used for collecting paper scraps.

6. The paper shredder capable of feeding paper laterally according to claim 5, wherein the cover plate is rotatably connected to the upper cover through a rotary connector, and the rotary connector comprises a mounting base, a rotary shaft and a torsion elastic piece;

the mounting base is fixed on the cover plate through a first mounting part;

the rotary shaft is disposed at one end of the mounting base;

the torsion elastic piece is disposed around the rotary shaft, has an actuating end fixedly disposed on the rotary shaft and a fixed end fixed on the upper cover through a second mounting part, and applies an elastic force to the rotary shaft and the cover plate to enable the rotary shaft and the cover plate to rotate away from the upper cover.

7. The paper shredder capable of feeding paper laterally according to claim 6, wherein the first mounting part is a first fixing screw.

8. The paper shredder capable of feeding paper laterally according to claim 6, wherein the torsion elastic piece is a torsion spring, a first torsion arm of the torsion spring is fixedly disposed on the rotary shaft, and a second torsion arm of the torsion spring is pressed and fixed on the upper cover through the second mounting part.

9. The paper shredder capable of feeding paper laterally according to claim 8, wherein a through groove is formed in a free end of the rotary shaft and extends in an axial direction, and the first torsion arm of the torsion spring is disposed in the through groove.

10. The paper shredder capable of feeding paper laterally according to claim 8, wherein the second mounting part is a second fixing screws, and the second torsion arm is fixed on the upper cover through the second fixing screw.

* * * * *